United States Patent
Pounds et al.

(10) Patent No.: US 10,691,485 B2
(45) Date of Patent: Jun. 23, 2020

(54) AVAILABILITY ORIENTED DURABILITY TECHNIQUE FOR DISTRIBUTED SERVER SYSTEMS

(71) Applicant: eBay Inc., San Jose, CA (US)

(72) Inventors: Jennica Jane Pounds, Bellevue, WA (US); Aidan Rogers, Shoreline, WA (US); Kang Liu, Shanghai (CN); Stanislav Pugach, Fall City, WA (US); Aiswarya Sridharan, Redmond, WA (US); Shuang Xu, Shanghai (CN)

(73) Assignee: eBay Inc., San Jose, CA (US)

( * ) Notice: Subject to any disclaimer, the term of this patent is extended or adjusted under 35 U.S.C. 154(b) by 149 days.

(21) Appl. No.: 15/895,850

(22) Filed: Feb. 13, 2018

(65) Prior Publication Data

US 2019/0250944 A1  Aug. 15, 2019

(51) Int. Cl.
*G06F 9/46* (2006.01)
*G06F 16/23* (2019.01)
*H04L 29/08* (2006.01)

(52) U.S. Cl.
CPC .......... *G06F 9/466* (2013.01); *G06F 16/2358* (2019.01); *G06F 16/2365* (2019.01); *H04L 67/02* (2013.01)

(58) Field of Classification Search
None
See application file for complete search history.

(56) References Cited

U.S. PATENT DOCUMENTS 7,631,097 B2  12/2009  Moch et al.

8,046,780 B1 * 10/2011  Alcock ............ G06F 9/52
                                              709/226

(Continued)

FOREIGN PATENT DOCUMENTS

CN  104267874 A  1/2015
CN  105379183 A  3/2016

(Continued)

OTHER PUBLICATIONS

Kim et al., "NWAL: Exploiting NVRAM in Write-Ahead Logging", Retrieved From the Internet URL: <http://esos.hanyang.ac.kr/files/publication/conferences/international/p385-kim.pdf>, 2016, 385-398 pp.

(Continued)

*Primary Examiner* — Wilson Lee
(74) *Attorney, Agent, or Firm* — Newport IP, LLC

(57) ABSTRACT

Disclosed are systems, methods, and non-transitory computer-readable media for an availability oriented durability technique for distributed server systems. A server that is an entry point for a message processing stream receives a message from a client device, and in response, generating a unique identifier for the message, and adds an entry in a transaction log that including the message and the unique identifier for the message. The server appends the unique identifier to the message, and transmits the message to a second server positioned downstream from the server in the message processing stream. If the server determines that the message has not been processed through the message processing stream, the server accesses the message from the transaction log, appends the unique identifier to the first message, and re-transmitting the message to the second server positioned downstream from the server in the message processing stream.

20 Claims, 9 Drawing Sheets

(56) References Cited

U.S. PATENT DOCUMENTS

| | | | |
|---|---|---|---|
| 8,145,859 B2 | 3/2012 | Park et al. | |
| 8,352,517 B2 | 1/2013 | Park et al. | |
| 8,683,262 B1 | 3/2014 | Subbiah et al. | |
| 8,738,723 B1 | 5/2014 | Faaborg et al. | |
| 8,745,164 B2 | 6/2014 | Choi et al. | |
| 8,972,637 B1 | 3/2015 | Hushon, Jr. et al. | |
| 2006/0230072 A1* | 10/2006 | Partovi | H04L 67/1057 |
| 2007/0124116 A1 | 5/2007 | Liu et al. | |
| 2007/0233724 A1* | 10/2007 | Kyoya | H04L 43/0852 |
| 2007/0239630 A1 | 10/2007 | Davis et al. | |
| 2009/0182798 A1 | 7/2009 | Chang et al. | |
| 2010/0188412 A1 | 7/2010 | Li et al. | |
| 2011/0154297 A1 | 6/2011 | Singh et al. | |
| 2011/0307540 A1 | 12/2011 | Martin | |
| 2012/0017063 A1 | 1/2012 | Hummel et al. | |
| 2012/0076152 A1 | 3/2012 | Mansharamani | |
| 2012/0240019 A1 | 9/2012 | Nuzzi | |
| 2012/0290947 A1 | 11/2012 | Baggett et al. | |
| 2013/0036427 A1 | 2/2013 | Chen et al. | |
| 2013/0103654 A1 | 4/2013 | Mclachlan et al. | |
| 2013/0311506 A1 | 11/2013 | Taubman et al. | |
| 2014/0181888 A1 | 6/2014 | Li et al. | |
| 2015/0006485 A1* | 1/2015 | Christiansen | G06F 16/2358 707/625 |
| 2015/0039648 A1 | 2/2015 | Mukherjee et al. | |
| 2015/0055778 A1 | 2/2015 | Cox et al. | |
| 2015/0077335 A1 | 3/2015 | Taguchi et al. | |
| 2015/0121524 A1 | 4/2015 | Fawaz et al. | |
| 2015/0143343 A1 | 5/2015 | Weiss et al. | |
| 2015/0163188 A1 | 6/2015 | Faaborg et al. | |
| 2015/0207705 A1 | 7/2015 | Piercey | |
| 2015/0256423 A1 | 9/2015 | Stearns | |
| 2015/0378938 A1 | 12/2015 | Lyman | |
| 2016/0011984 A1 | 1/2016 | Speer et al. | |
| 2016/0085809 A1 | 3/2016 | De castro alves et al. | |
| 2016/0085810 A1 | 3/2016 | De castro alves et al. | |
| 2016/0094944 A1 | 3/2016 | Kong et al. | |
| 2016/0103757 A1 | 4/2016 | Liu et al. | |
| 2016/0179799 A1 | 6/2016 | Raman et al. | |
| 2016/0203061 A1 | 7/2016 | Lee et al. | |
| 2016/0219089 A1 | 7/2016 | Murthy et al. | |
| 2016/0277419 A1 | 9/2016 | Allen et al. | |
| 2017/0024912 A1 | 1/2017 | De castro alves et al. | |
| 2017/0039242 A1* | 2/2017 | Milton | G06Q 30/0269 |
| 2017/0286281 A1* | 10/2017 | Dahan | G06F 11/3608 |

FOREIGN PATENT DOCUMENTS

| | | |
|---|---|---|
| CN | 105593854 A | 5/2016 |
| EP | 2921975 A1 | 9/2015 |
| WO | 2018/191879 A1 | 10/2018 |

OTHER PUBLICATIONS

Written Opinion received for PCT Patent Application No. PCT/CN2017/081048, dated Jan. 19, 2018, 3 pages.

International Search Report received for PCT Patent Application No. PCT/CN2017/081048, dated Jan. 19, 2018, 4 pages.

Preliminary Amendment for U.S. Appl. No. 15/781,922, filed Jun. 6, 2018, 3 pages.

"Twitter Snowflake Developer Tool", Retrieved from the Internet URL : <https://dev.twitter.com/overview/api/twitter-ids-son-and-snowflake>, Mar. 2, 2017, 2 pages.

International Preliminary report on Patentability received for PCT patent application No. PCT/CN2017/081048, dated Oct. 31, 2019, 5 pages.

* cited by examiner

AVAILABILITY ORIENTED DURABILITY TECHNIQUE FOR DISTRIBUTED SERVER SYSTEMS

TECHNICAL FIELD

An embodiment of the present subject matter relates generally to distributed server systems and, more specifically, to an availability oriented durability technique for distributed server systems.

BACKGROUND

Durability, in database terms, refers to the ability of a database to ensure that a transaction remains committed, even in the event of power loss or other issue. In distributed systems, consistency and availability exist in tension with each other, and in order to provide durability, availability is often sacrificed. As a result, it is difficult to provide a durable solution in a high-volume, latency sensitive system. For example, to reduce latency, some distributed systems are designed to write messages to storage at the end of a message processing stream. In other words, the message will travel through any number of application layers prior to being written to storage. This increases the potential of the message being lost or dropped prior to being written in storage.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
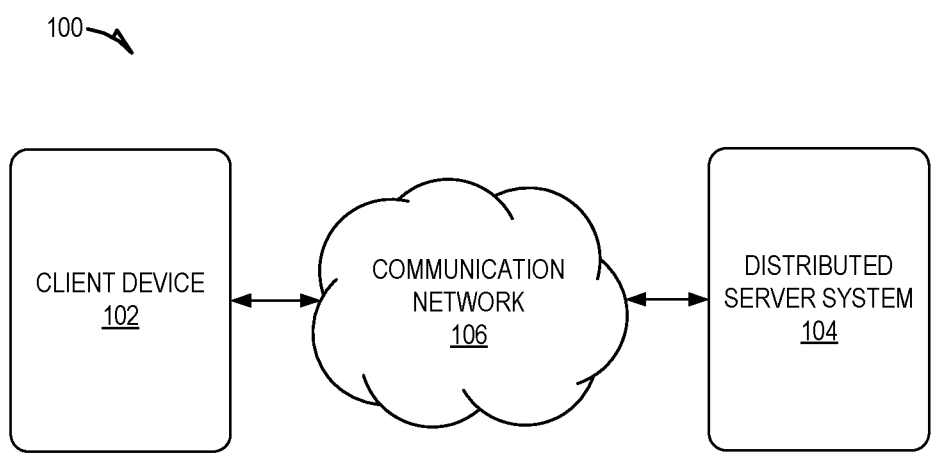
FIG. 1 shows an example system configuration, wherein electronic devices communicate via a network for purposes of exchanging content and other data.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for an availability oriented durability technique for distributed server systems. A distributed server system includes multiple computing devices configured to provide a service, such as online marketplace, transportation management service, etc. The distributed server system receives messages from client devices in relation to the service and processes the messages accordingly. In a distributed server system, messages may be processed by any number of application layers. For example, the distributed system may include a message processing stream for processing received messages that includes multiple interconnected servers or hops. Messages are initially received by a server that is an entry point to the message processing stream. The received messages are then transmitted to additional servers positioned downstream from the server until they reach the end point of the message processing stream.

When a message is received at the entry point, the distributed server system initially generates a unique identifier for the message and stores the message along with the unique identifier in a transaction log. The entry point then appends the message with its unique identifier and transmits the message to the next server in the message processing stream to be processed and/or persisted. When the message has been successfully processed and persisted, the end point of the message processing stream transmits an acknowledgement message that includes the unique identifier. Upon receiving the acknowledgement message, the distributed server system updates the corresponding entry in the transaction log to indicate that the message has been successfully processed and persisted. In the event that the message is not successfully processed and persisted (e.g., an acknowledgement message is not received), the distributed server system accesses the message from the transaction log and retransmits the message through the message processing stream. Storing the message at entry and then processing the message through the message processing stream maintains availability because the message is still ultimately persisted at the end of the message processing stream. Storing the message and using the unique identifier increases durability however, because the message can be retransmitted if it was not successfully persisted.

In some implementations, the unique identifier for a message is a 64 bit unique identifier that includes data associated with the message. For example, the unique identifier may include a sequence counter, a timestamp, and/or a machine identifier. The sequence counter is a numeric value assigned to messages in a sequential order, thereby indicating the order in which the messages were received. The timestamp indicates a time at which the message was received, and the machine identifier identifies the server that received the message, or the client device from which the message was received.

The distributed server system can determine whether a message was successfully processed and persisted at both the entry point and end point of the message processing stream. For example, the entry point may determine that a message was not successfully processed and persisted if a predetermined threshold period of time passes without receiving an acknowledgement message that the message was successfully processed and persisted. As another example, the entry point may determine that the message was not successfully processed and persisted if a threshold number of other messages with a higher sequential counter value were acknowledged as being successfully processed and persisted without having received an acknowledgement message for the message. Likewise, the end point of the message processing stream can determine that the message was not successfully processed and persisted if a threshold number of other messages with a higher sequential counter value were acknowledged as being successfully processed and persisted without having received an acknowledgement message for the message.

FIG. 1 shows an example system configuration 100, wherein electronic devices communicate via a network for purposes of exchanging content and other data. As shown, multiple devices (i.e., client device 102 and distributed server system 104) are connected to a communication network 106 and configured to communicate with each other through use of the communication network 106. The communication network 106 is any type of network, including a local area network ("LAN"), such as an intranet, a wide area network ("WAN"), such as the internet, or any combination thereof. Further, the communication network 106 may be a public network, a private network, or a combination thereof. The communication network 106 is implemented using any number of communications links associated with one or more service providers, including one or more wired communication links, one or more wireless communication links, or any combination thereof. Additionally, the communication network 106 is configured to support the transmission of data formatted using any number of protocols.

Multiple computing devices can be connected to the communication network 106. A computing device is any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of the computing device 900 shown in FIG. 9.

To facilitate communication with other computing devices, a computing device includes a communication interface configured to receive a communication, such as a request, data, etc., from another computing device in network communication with the computing device and pass the communication along to an appropriate module running on the computing device. The communication interface also sends a communication to another computing device in network communication with the computing device.

In the system 100, a user uses client device 102 to interact with the distributed server system 104 to access services provided by the distributed server system 104. For example, a user may use the client device 102 connected to the communication network 106 by direct and/or indirect communication to communicate with and utilize the functionality of the distributed server system 104. The distributed server system 104 may provide any type of service, such as an online marketplace, transportation reservation service, search provider, etc. Although the shown system 100 includes only one client device 102, this is only for ease of explanation and is not meant to be limiting. One skilled in the art would appreciate that the system 100 can include any number of client devices 102. Further the distributed server system 104 may concurrently accept connections from and interact with any number of client devices 102.

The distributed server system 104 supports connections from a variety of different types of client devices 102, such as desktop computers; mobile computers; mobile communications devices, e.g. mobile phones, smart phones, tablets; smart televisions; set-top boxes; and/or any other network enabled computing devices. Hence, the client device 102 may be of varying type, capabilities, operating systems, etc.

A user interacts with the distributed server system 104 via a client-side application installed on the client device 102. In some embodiments, the client-side application includes a distributed server system 104 specific component. For example, the component may be a stand-alone application, one or more application plug-ins, and/or a browser extension. However, the user may also interact with the distributed server system 104 via a third-party application, such as a web browser, that resides on the client device 102 and is configured to communicate with the distributed server system 104. In either case, the client-side application presents a user interface (UI) for the user to interact with the distributed server system 104. For example, the user interacts with the distributed server system 104 via a client-side application integrated with the file system or via a webpage displayed using a web browser application.

The distributed server system 104 includes multiple interconnected computing devices that are configured to provide computing services. For example, the distributed server system 104 receives a message from the client device 102 that requests a service, and the distributed server system 104 processes the message to provide the requested service. The distributed server system 104 may utilize any number of application layers to provide requested services. The distributed server system 104 uses a message processing stream that includes multiple interconnected servers or hops for processing messages received from the client device 102.

Messages are initially received by a server in the distributed server system 104 that is an entry point to the message processing stream. The received messages are then transmitted to additional servers positioned downstream from the entry point until they reach the end point of the message processing stream. For example, in an embodiment in which the distributed server system 104 provides an online marketplace, the client device 102 may transmit a message to the distributed server system 104 that is a search query for a specified item. In response to receiving the message, the distributed server system 104 transmits the message through a message processing stream that performs the requested search, generates search results and returns the search results to the client device 102 to be displayed to the user.

In addition to processing the messages, the distributed server system 104 may also persist the messages in a data storage. Persisting the messages includes storing a record of the message in memory. The persisted messages can be used for a variety of reasons such as for analytical purposes. To increase the speed at which user requests are processed (i.e., increase availability), the distributed server system 104 first processes messages (e.g., returns requested data) and then persists the messages to memory. Persisting the message at the end of the message processing stream increases the likelihood that a message is lost prior to being persisted.

To alleviate this issue, the distributed server system 104 writes a copy of the message initially when it is received at the entry point. For example, when a message is received at the entry point, the distributed server system 104 initially generates a unique identifier for the message and stores the message along with the unique identifier in a transaction log. The entry point then appends the message with its unique identifier and transmits the message to the next server in the message processing stream to be processed and/or persisted. When the message has been successfully processed and persisted, the end point of the message processing stream transmits an acknowledgement message that includes the unique identifier. Upon receiving the acknowledgement message, the distributed server system 104 updates the corresponding entry in the transaction log to indicate that the message has been successfully processed and persisted. In the event that the message is not successfully processed and persisted (e.g., an acknowledgement message is not received), the distributed server system 104 accesses the message from the transaction log and retransmits the message through the message processing stream.

To increase the speed at which messages are processed, the distributed server system 104 may include multiple entry points, each of which is capable of generating a unique identifier for a message, writing the message to the transaction log, appending the unique identifier to the message, and transmitting the message to the next server in the message processing stream. Accordingly, a log jam will not result as a result of having a single entry point. Each entry point may exist as a separate message processing stream, thereby increasing the speed at which messages may be received and processed by the distributed server system 104.

To further increase the speed at which messages are processed, the distributed server system 104 utilizes a memory-mapped approach for storing messages in the transaction log. Inside an operating system (OS), disk writes do not happen synchronously; rather, the kernel maintains a page cache of fixed-size contiguous memory segments called pages. When a page is updated, it is considered dirty, meaning that the changes on the page have not yet been persisted to disk. A memory-mapped file transparently opens up a segment of this kernel page cache for direct writing from the application. Data copied to the memory-mapped file will have the changes persisted to disk asynchronously. By mapping the transaction log to memory, the distributed server system 104 takes advantage of this OS optimization and increases the speed at which messages are written to the transaction log. Pages are assigned to application-layer pages that are some multiple of the kernel page size and are aligned with the kernel pages. Only a single thread is permitted to write to any given application-layer page.

Figure 2:
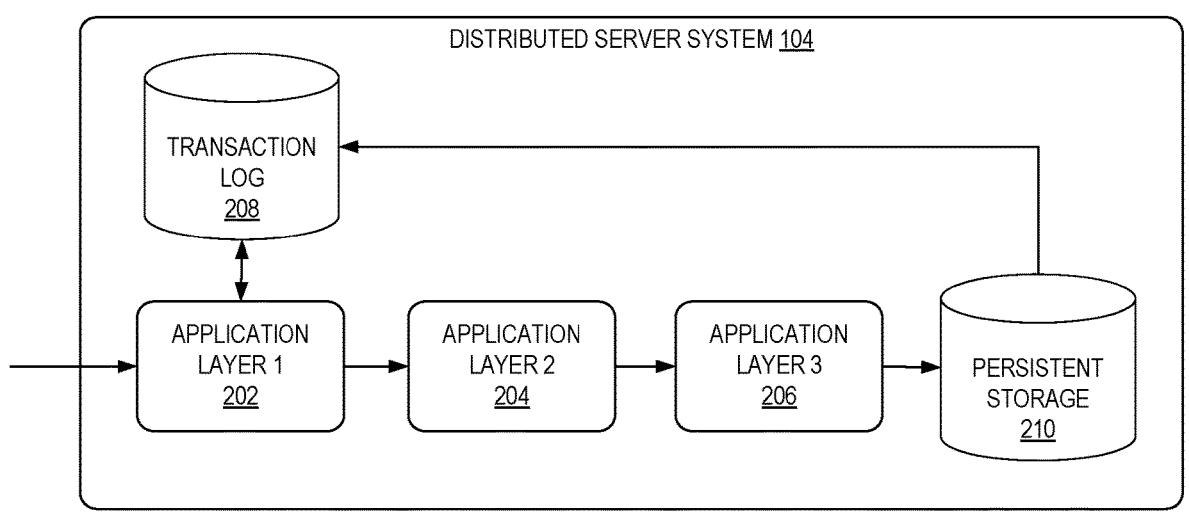
FIG. 2 is a distributed server system that uses an availability oriented durability technique, according to some example embodiments.

FIG. 2 is a distributed server system 104 that uses an availability oriented durability technique, according to some example embodiments. As shown, the distributed server system 104 includes three application layers (i.e., application layer 1 202, application layer 2 204, and application layer 3 206), a transaction log 208, and a persistent storage 201. Although three application layers are shown (i.e., application layer 1 202, application layer 2 204, and application layer 3 206), this is only an example and is not meant to be limiting. The distributed server system 104 can include any number of application layers, and this disclosure anticipates all such embodiments.

Messages received by the distributed server system 104 are initially received by application layer 1 202, which is designated as the entry point in a message processing stream that includes application layer 1 202, application layer 2 204, application layer 3 206, and the persistent storage 210. To process and persist a received message, the message is initially passed through application layer 1 202, then application layer 2 204, and followed by application layer 3 206. After the message is processed by application layer 3 206, the message is persisted into persistent storage 210. Persisting the message at the end of the message processing stream provides increased availability by prioritizing processing the message before writing it to memory, however durability is decreased because the increased chances of dropping the message prior to it being persisted. Accordingly, the distributed server system uses an availability oriented durability technique to increase durability, while maintaining availability.

When a message is initially received by the distributed server system 104, application layer 1 202 first generates a unique identifier for the message and writes the message and unique identifier to the transaction log 208. For example, application layer 1 202 creates a new entry in the transaction log 208 that includes the unique identifier and the payload of the received message. The new entry is initially marked as being unacknowledged, meaning that the message has not yet been successfully processed and persisted. The transaction log 208 is implemented using a memory-mapped approach that is described in greater detail below in relation to FIGS. 6 and 7.

In some implementations, the unique identifier for a message is a 64 bit unique identifier that includes data associated with the message. For example, the unique identifier may include a sequence counter, a timestamp, and/or a machine identifier. The sequence counter is a numeric value assigned to messages in a sequential order, thereby indicating the order in which the messages were received by the distributed server system 104. The timestamp indicates a time at which the message was received, and the machine identifier identifies the server that received the message.

After generating the new entry in the transaction log 208, application layer 1 202 appends the unique identifier to the message and begins processing the message through the message processing stream. For example, the message is processed by application layer 1 202, then application layer 2 204, followed by application layer 3 206.

After a message is processed by all three application layers, the message is persisted into persistent storage 210. Upon a message being successfully processed and persisted, the end point of the message processing stream transmits an acknowledgement message to the transaction log 208 indicating that the message was successfully processed and persisted. The acknowledgement message includes the unique identifier that was appended to the successfully processed and persisted message. In response to receiving the acknowledgement message, the transaction log 208 updates the entry corresponding to the unique identifier to indicate that the message has been acknowledged (i.e., successfully processed and persisted in the persistent storage 210).

In the event that a message is not successfully processed through the message processing stream (i.e., not successfully processed by the three application layers and persisted into the persistent storage), the message is retransmitted through the message processing stream. For example, application layer 1 202 accessed the message and the unique identifier from the transaction log, appends the unique identifier to the message, and retransmits the message through the message processing stream. As a result, messages that were not successfully processed and persisted will be retransmitted to ensure that they are successfully processed and persisted.

The distributed server system 104 can determine whether a message was successfully processed and persisted at both the entry point and end point of the message processing stream. For example, the entry point (i.e., application layer 1) may determine that a message was not successfully processed and persisted if a predetermined threshold period of time passes without receiving an acknowledgement message that the message was successfully processed and persisted. As another example, the entry point may determine that the message was not successfully processed and persisted if a threshold number of other messages with a higher sequential counter value were acknowledged as being successfully processed and persisted without having received an acknowledgement message for the message. Likewise, the end point of the message processing stream can determine that the message was not successfully processed and persisted if a threshold number of other messages with a higher sequential counter value were acknowledged as being successfully processed and persisted without having received an acknowledgement message for the message.

Figure 3:
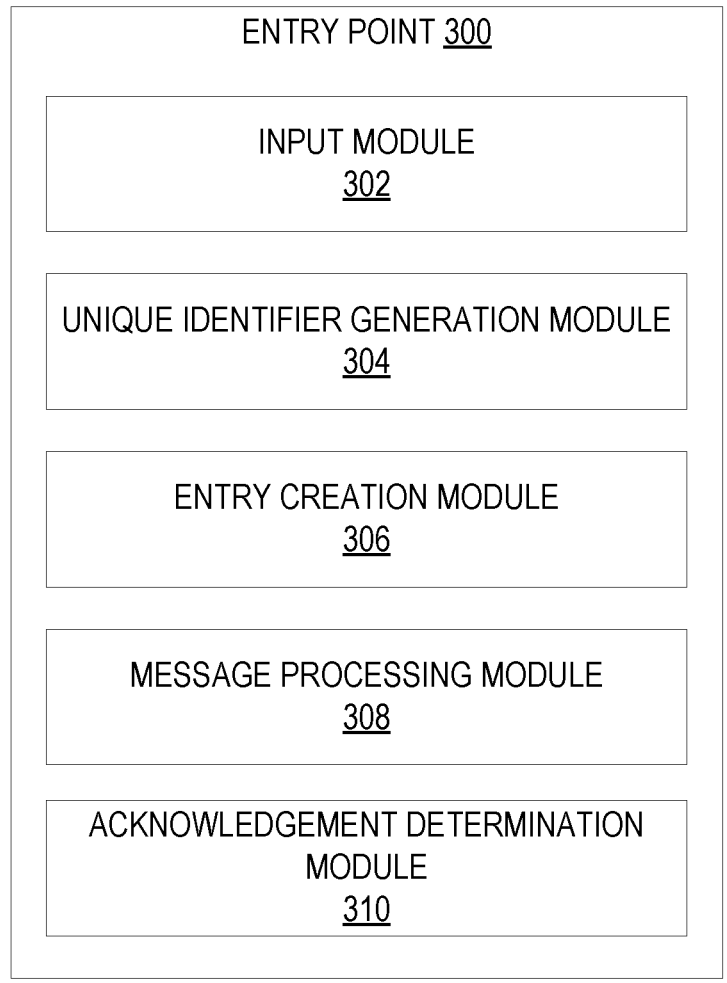
FIG. 3 is a block diagram of an entry point of a message processing stream, according to some example embodiments.

FIG. 3 is a block diagram of an entry point 300 of a message processing stream (e.g., application layer 1 202 shown in FIG. 2), according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the entry point 300 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the entry point 300 includes an input module 302, a unique identifier generation module 304, an entry creation module 306, a message processing module 308, and an acknowledgement determination module 310.

The input module 302 receives messages from a client device 102. The message may be a request for a service provided by the distributed server system 104. For example, the message may be an http request for web services provided by the distributed server system 104.

In response to receiving a message, the unique identifier generation module 304 generates a unique identifier for the received message. In some embodiments, the unique identifier is a 64 bit identifier that includes a timestamp, a machine identifier, and sequence counter. For example, the first 40 bits can include the timestamp, the middle 10 bits can include the machine identifier, and the lower 14 bits can include the sequence counter. The timestamp indicates a time at which the message was received, the machine identifier identifies the machine that received the message, and the sequence counter is a sequentially assigned number that indicates an order in which messages are received by the entry point 300. Generating this type of unique identifier has multiple benefits. For example, the identifier can be generated extremely fast, it is compact (fits within standard 64 bits), is guaranteed unique, provides a total ordering per machine (sequence counter), as well as a partial ordering over the distributed server system (timestamp).

The entry creation module 306 generates a new entry in the transaction log for each message received by the entry point 300. The new entry includes the unique identifier for the message, as well as the payload of the message. The entry creation module 306 initially marks the entry as being unacknowledged, meaning that the message has not yet been successfully processed and persisted.

The message processing module 308 initiates processing of a message through the message processing stream. The message processing module 308 appends the unique identifier to the message and begins processing the message through the message processing stream. For example, the message is processed through multiple application layers and is finally persisted in a persistent storage 210.

The acknowledgement determination module 310 determines whether a message has been successfully processed and persisted. When a message is successfully processed and persisted into the persistent storage 210, an end point of the message processing stream transmits an acknowledgement message indicating that the message has been successfully processed and persisted. The acknowledgement message includes the unique identifier appended to the message that was processed and persisted. In response to receiving an acknowledgement message, the acknowledgement determination module 310 determines that the message has been successfully processed and persisted and updates the transaction log 208 accordingly. For example, the acknowledgement determination module 310 uses the unique identifier included in the acknowledgement message to identify the corresponding entry in the transaction log 208. The acknowledgement determination module 310 then updates the entry to indicate that the message was acknowledged.

The acknowledgement determination module 310 determines that a message has not been successfully processed and persisted if a predetermined amount of time elapses without having received an acknowledgement message. As another example, the acknowledgement determination module 310 may determine that the message was not successfully processed and persisted if a threshold number of other messages with a higher sequential counter value were acknowledged as being successfully processed and persisted without having received an acknowledgement message for the message.

In the event that the acknowledgement determination module 310 determines that a message has not been successfully processed and persisted, the acknowledgement determination module 310 instructs the message processing module 308 to reinitiate processing of the message. As a result, the message processing module 308 gathers the message and unique identifier form the transaction log, appends the unique identifier to the message and begins processing the message through the message processing stream.

Figure 4:
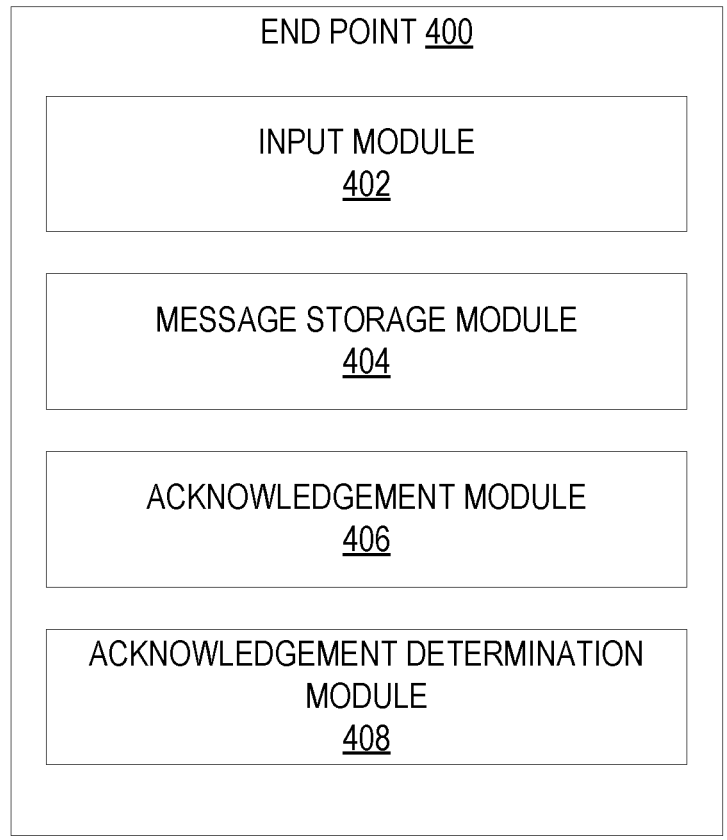
FIG. 4 is a block diagram of an end point of a message processing stream, according to some example embodiments.

FIG. 4 is a block diagram of an end point 400 of a message processing stream, according to some example embodiments. To avoid obscuring the inventive subject matter with unnecessary detail, various functional components (e.g., modules) that are not germane to conveying an understanding of the inventive subject matter have been omitted from FIG. 4. However, a skilled artisan will readily recognize that various additional functional components may be supported by the end point 400 to facilitate additional functionality that is not specifically described herein. Furthermore, the various functional modules depicted in FIG. 4 may reside on a single computing device or may be distributed across several computing devices in various arrangements such as those used in cloud-based architectures.

As shown, the end point 400 includes an input module 402, a message storage module 404, an acknowledgement message module 406, and an acknowledgement determination module 408.

The input module 402 receives a message that is being processed through the message processing stream. The end point 400 is the end of the message processing stream. Hence the received message was processed by the application layers of the message processing stream.

The message storage module 404 persists received messages in the persistent storage 210. This includes storing the payload of the message in the persistent storage.

The acknowledgement module 406 transmits an acknowledgement message indicating that a message was successfully processed and persisted. The acknowledgement message is transmitted to the entry point 300 of the message processing stream. The acknowledgment message includes the unique identifier appended to the message was processed and persisted. The entry point 300 uses the unique identifier to mark the corresponding entry in the transaction log 208 as acknowledged.

The acknowledgement determination module 408 determines in a message has not been successfully processed and persisted. For example, the acknowledgement determination module 408 may determine that a message has not been successfully processed and persisted if a threshold number of other messages with a higher sequential counter value were successfully processed and persisted. In response to determining that a message was not successfully processed and persisted, the acknowledgement determination module 408 transmits a message to the entry point 300 of the message processing stream that instructs the entry point to reinitiate processing of the message. As a result, the entry point 300 gathers the message and unique identifier from the transaction log 208 and reinitiates processing of the message through the message processing stream.

Figure 5:
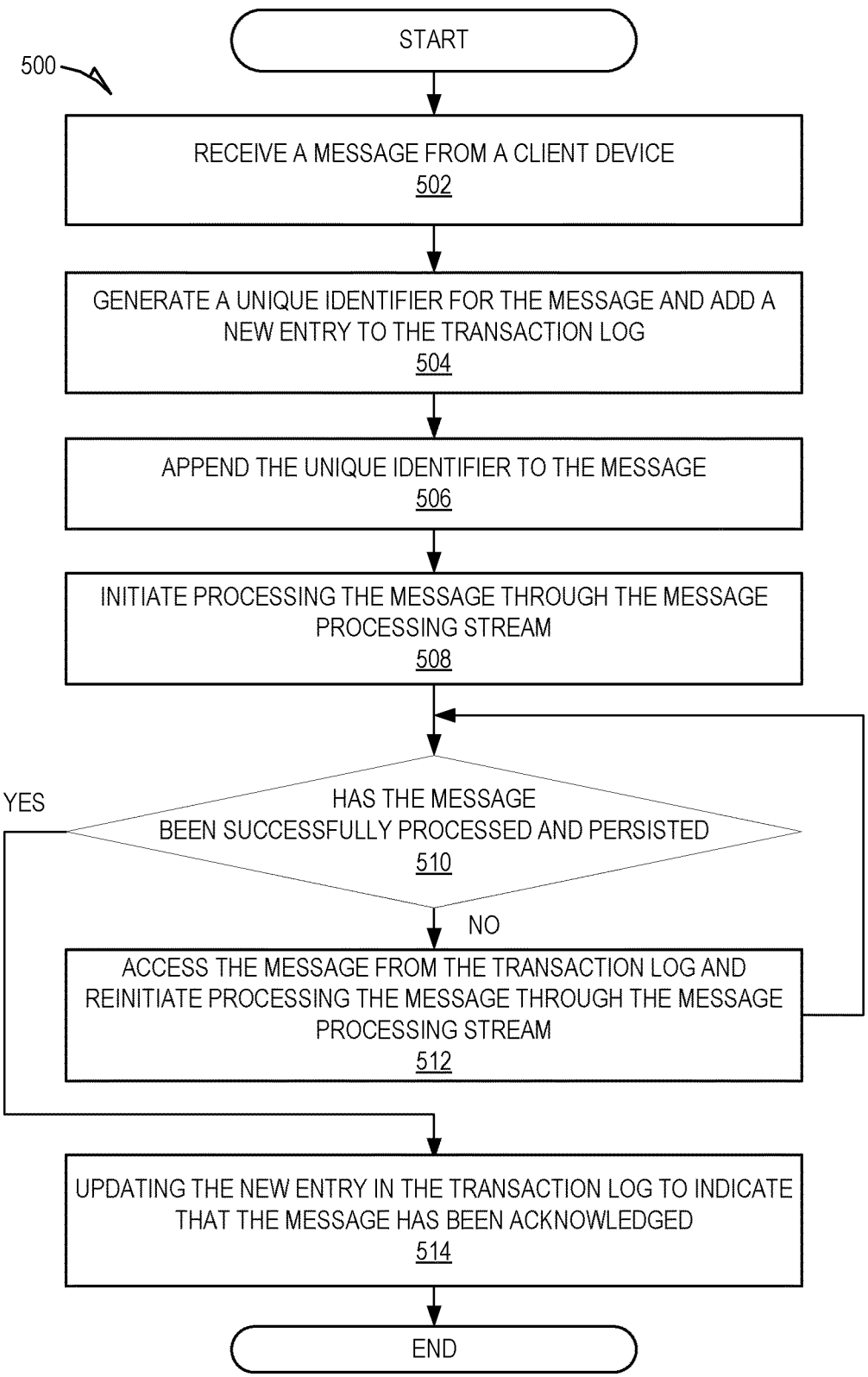
FIG. 5 is a flowchart showing an example method of an availability oriented durability technique, according to certain example embodiments.

FIG. 5 is a flowchart showing an example method 500 of an availability oriented durability technique, according to certain example embodiments. The method 500 may be embodied in computer readable instructions for execution by one or more processors such that the operations of the method 500 may be performed in part or in whole by the entry point 300; accordingly, the method 500 is described below by way of example with reference thereto. However, it shall be appreciated that at least some of the operations of the method 500 may be deployed on various other hardware configurations and the method 500 is not intended to be limited to the entry point 300.

At operation 502, the input module 302 receives a message from a client device 102. The message may be a request for a service provided by the distributed server system 104. For example, the message may be an http request for web services provided by the distributed server system 104.

At operation 504, the unique identifier generation module 304 generates a unique identifier for the message, and the entry creation module 306 adds a new entry to the transaction log 208. In some embodiments, the unique identifier is a 64 bit identifier that includes a timestamp, a machine identifier, and sequence counter. For example, the first 40 bits can include the timestamp, the middle 10 bits can include the machine identifier, and the lower 14 bits can include the sequence counter. The timestamp indicates a time at which the message was received, the machine identifier identifies the machine that received the message, and the sequence counter is a sequentially assigned number that indicates an order in which messages are received by the entry point 300. Generating this type of unique identifier has multiple benefits. For example, the identifier can be generated extremely fast, it is compact (fits within standard 64 bits), is guaranteed unique, provides a total ordering per machine (sequence counter), as well as a partial ordering over the distributed server system (timestamp).

The entry creation module 306 generates a new entry in the transaction log for the message. The new entry includes the unique identifier for the message, as well as the payload of the message. The entry creation module 306 initially marks the entry as being unacknowledged, meaning that the message has not yet been successfully processed and persisted.

At operation 506, the message processing module 308 appends the unique identifier to the message and at operation 508 initiates processing the message through the message processing stream. For example, the message is processed through multiple application layers and is finally persisted in a persistent storage 210.

At operation 510, the acknowledgement determination module 310 determines whether the message has been successfully processed and persisted. The acknowledgement determination module 310 determines that the message has been successfully processed and persisted if an acknowledgement message is received. The acknowledgement determination module 310 determines that a message has not been successfully processed and persisted if a predetermined amount of time elapses without having received an acknowledgement message. As another example, the acknowledgement determination module 310 may determine that the message was not successfully processed and persisted if a threshold number of other messages with a higher sequential counter value were acknowledged as being successfully processed and persisted without having received an acknowledgement message for the message. As another example, the acknowledgement determination module 310 determines that the message was not successfully processed and persisted if a message is received from the end point 400 of the message processing stream indicating that the message was not successfully processed and persisted. For example, the end point 400 transmits the message in response to determining that a threshold number of other messages with a higher sequential counter value were successfully processed and persisted.

In the event that the acknowledgement determination module 310 determines that a message has not been successfully processed and persisted, the acknowledgement determination module 310 instructs the message processing module 308 to reinitiate processing of the message. As a result, at operation 512, the message processing module 308 accesses the message from the transaction log 208 and reinitiates processing the message through the message processing stream. The method then returns to operation 510.

Alternatively, if the acknowledgement determination module 310 determines that the message has been successfully processed and persisted, at operation 514 the acknowledgement determination module 310 updates the new entry in the transaction log to indicate that the message has been acknowledged.

Figure 6:
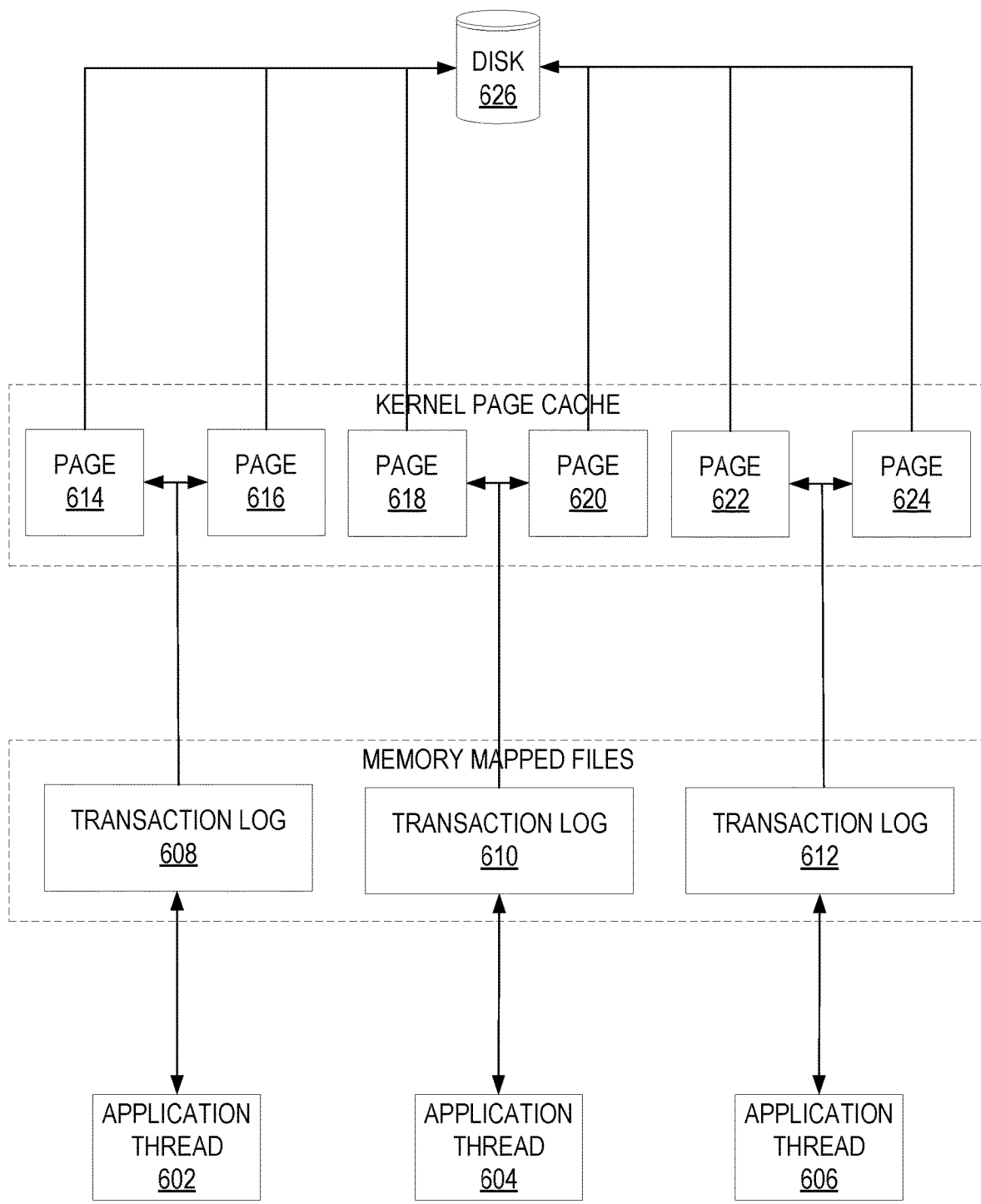
FIG. 6 shows transaction logs implemented using a memory-mapped approach, according to some example, embodiments.

FIG. 6 shows transaction logs implemented using a memory-mapped approach, according to some example, embodiments. As show, each application threads 602, 604 and 606 is permitted to write to one of the transaction logs 608, 610 and 612, which are each memory-mapped files. For example, application thread 602 uses transaction log 608, application thread 604 uses transaction log 610, and application thread 606 uses transaction log 612. One advantage of using memory mapped files is that writing to a memory mapped file has the same application overhead as writing to memory, which is very little, but there is no Input/Output (I/O) blocking, as with conventional files.

As shown each transaction log 608, 610 and 612 is mapped to a set of fixed-size contiguous memory segments called pages. For example, transaction log 608 is mapped to pages 614 and 616, transaction log 610 is mapped to pages 618 and 620, and transaction log 612 is mapped to pages 622 and 624. To eliminate write contention at the page cache layer, each of the transaction logs 608, 610 and 612 should be byte aligned with its corresponding pages, meaning that the size of transaction log is a multiple of one of the pages. As shown, each of the transaction logs is mapped to two pages, meaning that each page is approximately half the size of the transaction log. For example, in Linux systems, pages in the kernel page cache are typically 4096 KB each, meaning that the corresponding transaction logs would be a multiple of 4096 KB, such as 8192 KB.

When an application thread writes to its transaction log, the data is written directly to the pages mapped to the transaction log. For example, when application thread 602 writes to transaction log 608, the data is written directly to page 614 and/or page 616. When a page is updated, it is considered dirty, meaning that the changes on the page have not yet been persisted to disk. A memory-mapped transaction log file transparently opens up a segment of this kernel page cache for direct writing from the application thread. Data copied to the memory-mapped transaction log file will have the changes persisted to the disk 626 asynchronously. There are three scenarios when the changes to the memory-mapped transaction log will be saves to the disk: when the transaction log is unmapped, causing the OS to automatically save the contents of the transaction log to the disk 626; when the OS decides on its own to evict dirty pages to the disk 626; and when msync( ) is explicitly invoked at the application layer.

In addition to the above described memory-mapped approach for implementing the transaction logs, the transaction log are further structured to optimize the speed at which data is written, updated, and checked for state. For example, the transaction log may be structured so that is agreeable for multiple CPU cores to write to in parallel. In certain implementations, billions of requests may be writer to transaction logs per day. Accordingly, the transaction log can be structured to allow for tracking each requests state efficiently, as well as identifying rows that may potentially have not been successfully processed.

In some embodiments, each transaction log is divided into 4096 or 8192 pages of fixed length. The pages are fixed at the time of file creation. Each page may be 8192, 16384, or 32768 bytes in length, which are also fixed at the time of file creation. Pages may further be divided into alignments of 128 or 256 bytes, which is fixed at the time of file creation. Alignments are a minimal unit of allocation.

According to the above example configuration, transaction logs may be 32 MB to 256 MB in volume. Preferably settings should be chosen so that a computer server has enough space to hold several transaction logs in memory. As alignments are a minimal unit of allocation, the maximum number of persisted records may be anywhere from 131072 to 2097152 bytes. Preferably, the settings should favor more alignments per file so that fewer new files have to be held in reserve. Furthermore, page sized may preferably be choses so that the system may bind the files to the CPU cache, which provides increased performance over RAM.

Figure 7:
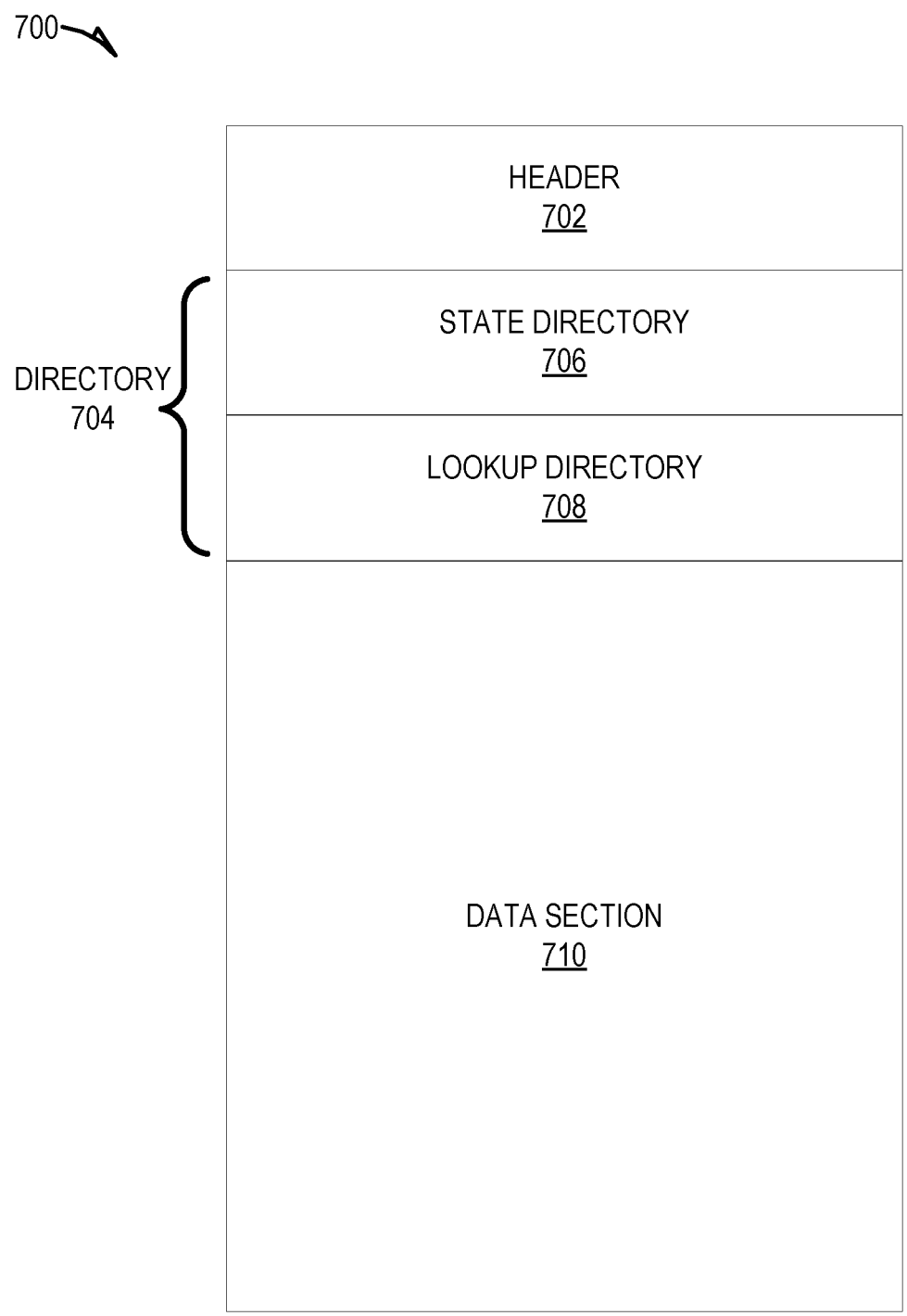
FIG. 7 shows a transaction log file allocation hierarchy, according to some example embodiments.

FIG. 7 shows a transaction log file allocation hierarchy, according to some example embodiments. As shown, there are three major logical sections to the transaction log 700. The header 702 starts at the zero byte offset and consisted of file metadata that is rarely updated after the time of creation. The directory section 704 is an optimized lookup table of row entries. The directory is subdivided into two sections: the state directory 706 and the lookup directory 708. The lookup directory 708 contains individual row entries and their addresses. The state directory 706 maps to the lookup directory 708 on a 1:1 basis. Subdividing the directory section 704 into a state directory 706 and a lookup directory 708 reduces write contention. The data section 710 contains the persisted messages. Each section is discussed in greater detail below.

The header section 702 generally contains information that is fixed at the time that the transaction log 700 is created. This includes configuration data that provides information about how to access the rest of the data included in the transaction log 700, such as magic number (safeguards against corruption, version number, machine identifier, number of pages, page size, alignment size, directory section offset and size, and data section offset and size. The header section 702 may also include additional pieces of file-level metadata that is rarely updated, such as an is full flag, page offset to the first data page with available space, lowest unique identifier written to file (for optimization), and a highest unique identifier written to file (for optimization).

The directory section 704 is conceptually a list of tuples (e.g., entries) for each message stored to the transaction log 700. Each tuple includes the unique identifier for the stored message, a page ID offset, alignment offset (intra-page), and a state of the message (i.e., acknowledged or unacknowledged). Each message written to the transaction log 700 is identified by its unique identifier, and located using a particular page offset and alignment offset inside the directory. The state of message indicates whether the message is acknowledged or unacknowledged. Accordingly, when a new message is written to the transaction log 700, the state of the message is initially recorded as unacknowledged. When a message is written to a transaction log 700, the message payload is written to the data section 710, and the offset with the page and page id are written to the lookup directory 708.

When a message has been successfully processed and persisted, the corresponding entry in the directory 704 is updated to indicate the change in state of the message from unacknowledged to acknowledged. By separating the directory 704 into a state directory 706 and a lookup directory 708, only one thread/process writes to a given page at a given time. As a result, there is no need to place a cross-process lock on every update to the directory 704 to prevent a write race condition caused by two threads writing to the same data page. The lookup directory 708 contains the unique identifiers and their addresses, while the state directory 706 contains the sates of the entries and has 1:1 mapping to the lookup directory 708. As a result, it is safe for any thread to read from the lookup directory 708, with the understanding that updates to the lookup directory 708 may be delated until the persistence thread writes to disk.

Unique identifiers are written to the lookup directory 708 in a first-come order, however since multiple requests are processed in parallel, the unique identifiers are not necessarily written in the order of generation.

The data section 710 is written to by its exclusive application thread. Rows are written to pages in the data section 710 in append order with respect to the individual page, with two extra bytes for the length prefix. Rows may be padded to their nearest alignment. Because each page is bound to a single application thread, and because the unique identifiers are generated in monotonically increasing order, messages are stored in increasing order within a page.

Software Architecture

Figure 8:
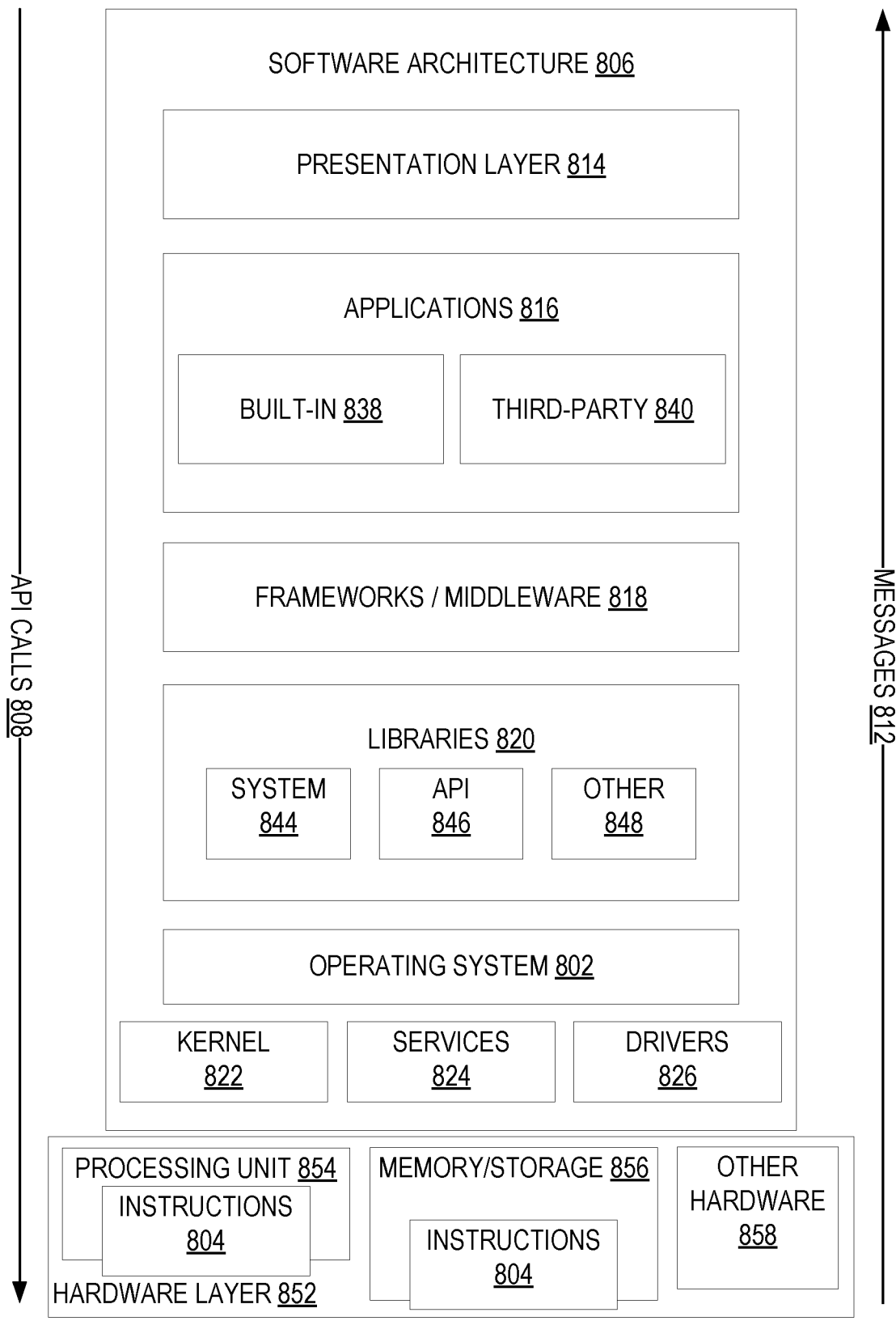
FIG. 8 is a block diagram illustrating a representative software architecture, which may be used in conjunction with various hardware architectures herein described.

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. The software architecture 806 may execute on hardware such as machine 900 of FIG. 9 that includes, among other things, processors 904, memory 914, and (input/output) I/O components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive a response as in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be used by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824 and/or drivers 826), libraries 820, and frameworks/middleware 818 to create user interfaces to interact with users of the system. Alternatively, or additionally, in some systems interactions with a user may occur through a presentation layer, such as presentation layer 814. In these systems, the application/component "logic" can be separated from the aspects of the application/component that interact with a user.

Figure 9:
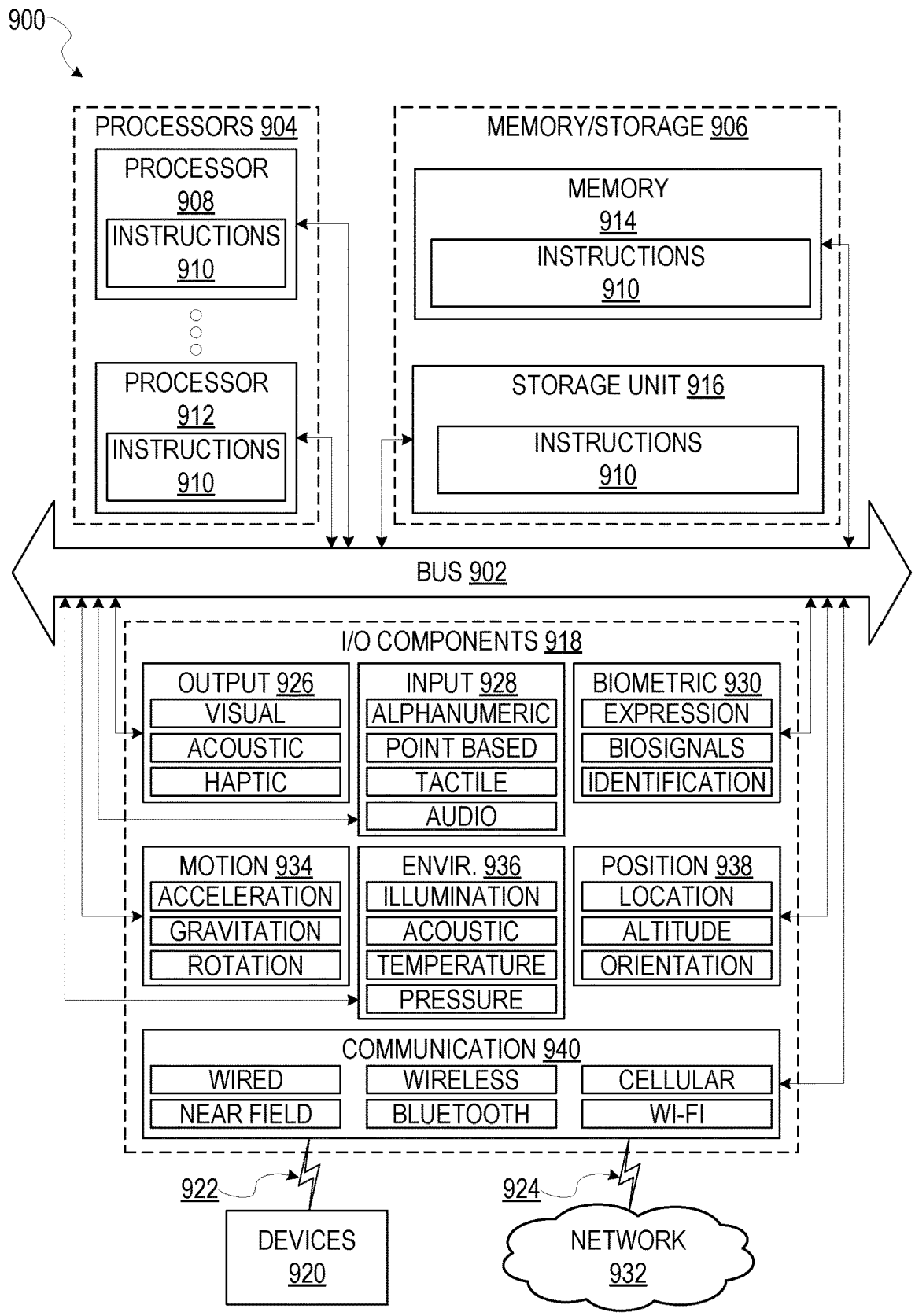
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environment components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 924 and coupling 922, respectively. For example, the communication components 940 may include a network interface component or other suitable device to interface with the network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, STBs, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may be, for example, a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

What is claimed is:

1. A method comprising:
   receiving, by a first server, a first message from a client device, the first server being an entry point for a message processing stream that includes at least a second server positioned downstream from the first server in the message processing stream;
   in response to receiving the first message:
     generating a unique identifier for the first message, and
     adding an entry in a transaction log, the entry including the first message and the unique identifier for the first message;
   appending the unique identifier to the first message, and transmitting the first message to the second server positioned downstream from the first server in the message processing stream;
   determining that the first message has not been processed through the message processing stream; and
   in response to determining that the first message has not been processed through the message processing stream:
     accessing the first message from the transaction log; and
     appending the unique identifier to the first message, and re-transmitting the first message to the second server positioned downstream from the first server in the message processing stream.

2. The method of claim 1, further comprising:
   receiving an acknowledgement message that the first message has been processed through the message processing stream; and
   updating the entry in the transaction log to indicate that the first message has been acknowledged.

3. The method of claim 1, wherein determining that the message has not been processed through the message processing stream comprises:
   determining that a threshold period of time has elapsed without receiving acknowledgement that the first message been processed through the message processing stream.

4. The method of claim 1, wherein determining that the message has not been processed through the message processing stream comprises:
   receiving, from a third server that is an end point of the message processing stream, a message indicating that the first message has not yet been received by the third server.

5. The method of claim 1, wherein the unique identifier is a 64 bit identifier including a sequence counter.

6. The method of claim 5, wherein determining that the message has not been processed through the message processing stream comprises:
   receiving, from a third server that is an end point of the message processing stream, a message indicating that the first message has not yet been received by the third server, the third server having determined that a threshold number of messages were received that have sequence counters that are higher than the sequence counter included in the unique identifier of the first message.

7. The method of claim 1, wherein the first server is an http server and the first request is an http request.

8. A server comprising:
one or more computer processors; and
one or more computer-readable mediums storing instructions that, when executed by the one or more computer processors, cause the server to perform operations comprising:
receiving a first message from a client device, the server being an entry point for a message processing stream that includes at least a second server positioned downstream from the server in the message processing stream;
in response to receiving the first message:
generating a unique identifier for the first message, and
adding an entry in a transaction log, the entry including the first message and the unique identifier for the first message;
appending the unique identifier to the first message, and transmitting the first message to the second server positioned downstream from the server in the message processing stream;
determining that the first message has not been processed through the message processing stream; and
in response to determining that the first message has not been processed through the message processing stream:
accessing the first message from the transaction log; and
appending the unique identifier to the first message, and re-transmitting the first message to the second server positioned downstream from the server in the message processing stream.

9. The server of claim 8, the operations further comprising:
receiving an acknowledgement message that the first message has been processed through the message processing stream; and
updating the entry in the transaction log to indicate that the first message has been acknowledged.

10. The server of claim 8, wherein determining that the message has not been processed through the message processing stream comprises:
determining that a threshold period of time has elapsed without receiving acknowledgement that the first message been processed through the message processing stream.

11. The server of claim 8, wherein determining that the message has not been processed through the message processing stream comprises:
receiving, from a third server that is an end point of the message processing stream, a message indicating that the first message has not yet been received by the third server.

12. The server of claim 8, wherein the unique identifier is a 64 bit identifier including a sequence counter.

13. The server of claim 12, wherein determining that the message has not been processed through the message processing stream comprises:
receiving, from a third server that is an end point of the message processing stream, a message indicating that the first message has not yet been received by the third server, the third server having determined that a threshold number of messages were received that have sequence counters that are higher than the sequence counter included in the unique identifier of the first message.

14. The server of claim 8, wherein the server is an http server and the first request is an http request.

15. A non-transitory computer-readable medium storing instructions that, when executed by one or more computer processors of a server, cause the server to perform operations comprising:
receiving a first message from a client device, the server being an entry point for a message processing stream that includes at least a second server positioned downstream from the server in the message processing stream;
in response to receiving the first message:
generating a unique identifier for the first message, and
adding an entry in a transaction log, the entry including the first message and the unique identifier for the first message;
appending the unique identifier to the first message, and transmitting the first message to the second server positioned downstream from the server in the message processing stream;
determining that the first message has not been processed through the message processing stream; and
in response to determining that the first message has not been processed through the message processing stream:
accessing the first message from the transaction log; and
appending the unique identifier to the first message, and re-transmitting the first message to the second server positioned downstream from the server in the message processing stream.

16. The non-transitory computer-readable medium of claim 15, the operations further comprising:
receiving an acknowledgement message that the first message has been processed through the message processing stream; and
updating the entry in the transaction log to indicate that the first message has been acknowledged.

17. The non-transitory computer-readable medium of claim 15, wherein determining that the message has not been processed through the message processing stream comprises:
determining that a threshold period of time has elapsed without receiving acknowledgement that the first message been processed through the message processing stream.

18. The non-transitory computer-readable medium of claim 15, wherein determining that the message has not been processed through the message processing stream comprises:
receiving, from a third server that is an end point of the message processing stream, a message indicating that the first message has not yet been received by the third server.

19. The non-transitory computer-readable medium of claim 15, wherein the unique identifier is a 64 bit identifier including a sequence counter.

20. The non-transitory computer-readable medium of claim 19, wherein determining that the message has not been processed through the message processing stream comprises:
receiving, from a third server that is an end point of the message processing stream, a message indicating that the first message has not yet been received by the third server, the third server having determined that a threshold number of messages were received that have sequence counters that are higher than the sequence counter included in the unique identifier of the first message.

* * * * *